United States Patent [19]

Russell et al.

[11] Patent Number: 4,818,400
[45] Date of Patent: Apr. 4, 1989

[54] CYCLONE AND FILTER BELT APPARATUS FOR DEWATERING

[75] Inventors: Robert G. Russell, Denton; Roy D. Lister, Keller, both of Tex.

[73] Assignee: Eagle-Picher Industries, Inc., Cincinnati, Ohio

[21] Appl. No.: 132,173

[22] Filed: Dec. 14, 1987

[51] Int. Cl.⁴ .................... B01D 33/04; B01D 36/00
[52] U.S. Cl. .............................. 210/262; 210/297; 210/400; 210/512.2
[58] Field of Search ............... 210/255, 261, 262, 297, 210/400, 512.1, 512.2, 806; 209/13, 17, 243, 307

[56] References Cited

U.S. PATENT DOCUMENTS

| 1,061,660 | 5/1913 | Caldecott | 210/262 |
| 3,989,628 | 11/1976 | Bier | 210/262 |
| 4,110,218 | 8/1978 | Marriott et al. | 210/297 |
| 4,436,617 | 3/1984 | Moore et al. | 209/17 |

FOREIGN PATENT DOCUMENTS

| 191257 | 10/1907 | Fed. Rep. of Germany | 210/262 |
| 2916860 | 11/1980 | Fed. Rep. of Germany | 210/400 |
| 143080 | 12/1978 | Japan | 210/512.1 |
| 143081 | 12/1978 | Japan | 210/512.1 |

Primary Examiner—Richard V. Fisher
Assistant Examiner—Linda Evans
Attorney, Agent, or Firm—Wood, Herron & Evans

[57] ABSTRACT

Apparatus for dewatering. The effluent to be dewatered is passed through a hydrocyclone. The underflow of the hydrocyclone is confined by a shroud to convert horizontal components of spray into vertical components. The effluent is driven forcibly vertically onto an endless driven filter belt.

3 Claims, 1 Drawing Sheet

CYCLONE AND FILTER BELT APPARATUS FOR DEWATERING

BACKGROUND OF THE INVENTION

This invention relates to a dewatering method and apparatus.

While the method and apparatus of the present invention have many applications in the industrial separation of solids from liquids, its utility in connection with the separation of burned particles in a particle board manufacturing plant will be described.

In a particle board manufacturing plant, wood chips are burned in an incinerator to create heat. Hot flue gases are created that contain unburned particles, carbon, and soot. The hot flue gases are passed through a scrubber where water takes the solids out of the gases. Currently, the effluent from the scrubber with its entrained particles is directed into a pit where the effluent sits while the solids slowly settle out. The Environmental Protection Agency demands that the problem of the open pit be addressed. Rain tends to fill up the pit and spread the effluent all over the surrounding soil. In an attempt to solve the problem, a front end loader has been used to dredge out the pit. This operation frequently results in damage to the front end loader.

SUMMARY OF THE INVENTION

An objective of the present invention has been to deal with the problem of the effluent from the scrubber.

Another objective of the invention has been to provide a method and apparatus for dewatering industrial materials.

The objectives of the invention are achieved by creating the combination of a hydrocyclone and a filter belt.

The hydrocyclone is a vertical device that receives liquid, tangentially, in the central portion of the device. Liquid, substantially free of solids, overflows the top of the hydrocyclone. The concentrated slurry discharges as underflow out of the lower end of the hydrocyclone. The substantially clean water is conveyed back to the scrubber for reuse.

The underflow commonly has 20%-30% solids with 70%-80% water. That underflow is directed onto the upper flight of a filter belt, the filter belt being driven in order to provide for the continuous removal of the filter cake. As the concentrated slurry is driven into the filter belt, a filter cake builds upon the fiber belt. The filter cake allows for depth filtration to take place, that is, using the filter cake in part as a filter in addition to the filter belt. This combination separates considerable additional water from the concentrated slurry so that the resulting filter cake is approximately 70%-80% solids and 20%-30% water. This filter cake material may be usable as, for example, potting soil.

The invention further provides for a cylindrical shroud at the lower end of the hydrocyclone, the cylindrical shroud providing assurance that all of the components of the hydrocyclone are directed vertically onto the filter belt. Without the shroud, there is a tendency of the underflow to spray at an angle out of the lower end of the hydrocyclone. The angled spray does not produce as satisfactory a result. It is very important to the practical operation of the device that the concentrated slurry be driven stright down so that a portion of the water is forcibly driven through the filter cake and filter belt, otherwise a liquid will form a large pool on the belt necessitating the use of a much larger filtering area and an impractically long time to drain.

The several features and objectives of the present invention will become more readily apparent from the following detailed description taken in conjunction with the accompanying drawings in which:

DETAILED DESCRIPTION OF THE PREFERRED EMBODIMENT

Figure 1:
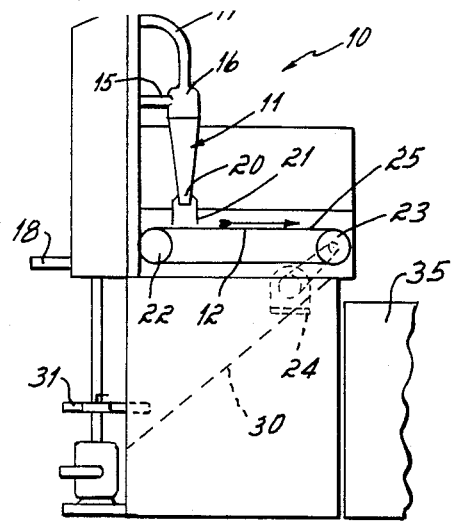
FIG. 1 is a diagrammatic side elevational view of the invention.
Figure 4:
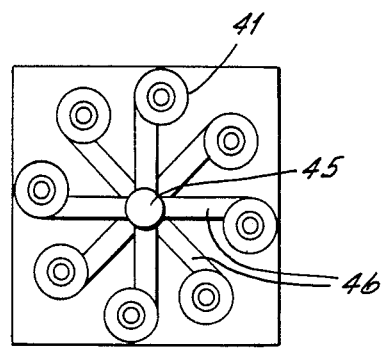
FIG. 4 is a diagrammatic top plan view of the hydrocyclone layout in the embodiment of FIG. 2.

The apparatus is shown at 10 in FIG. 1. Its two major components are the hydrocyclone 11 and the filter belt 12.

The hydrocyclone 11 has an inlet 15 by which the slurry to be separated is introduced into the system. The hydrocyclone has an upper end 16 out of which substantially clean liquid overflows. A conduit 17 is provided to carry that overflow to a return 18 where it can be reused.

The hydrocyclone has a lower end 20 out of which the underflow is discharged. The lower end is preferably connected to a shroud 21 which converts horizontal components of flow to a totally vertical flow moving in a downward direction. The filter belt 12 underlies the hydrocyclone. The filter belt is preferably rated 20 to 150 microns. It may have, for example, a 70 micron mesh. The filter belt passes around an upstream pulley 22 and the downstream pulley 23. The downstream pulley is connected to a motor 24 that drives the belt to pull its upper run 25 in the direction of the arrow.

A hopper 30 underneath the filter belt conveys the (filtrate) water, separated from much of the solids, to an outlet 31. This filtrate may also be recycled through the pump and back through the cyclone, or it may be pumped back to the filter belt for additional solids removal. A container 35 may be disposed at the downstream or discharge end of the filter belt 12 to receive the filter cake as it flows off the belt.

In operation, effluent from a scrubber, for example, is pumped under pressure to the inlet of the hydrocyclone. Substantially clean water overflows the hydrocyclone and is conveyed back to the scrubber for reuse. The underflow is directed under pressure onto the upper run of the filter belt. There a filter cake is formed by the passage of the water through the filter belt. The filter cake itself participates in the filtration of oncoming slurry from the hydrocyclone. At the discharge end of the filter belt, the filter cake is removed. It is about 70% to 80% solids.

Figure 2:
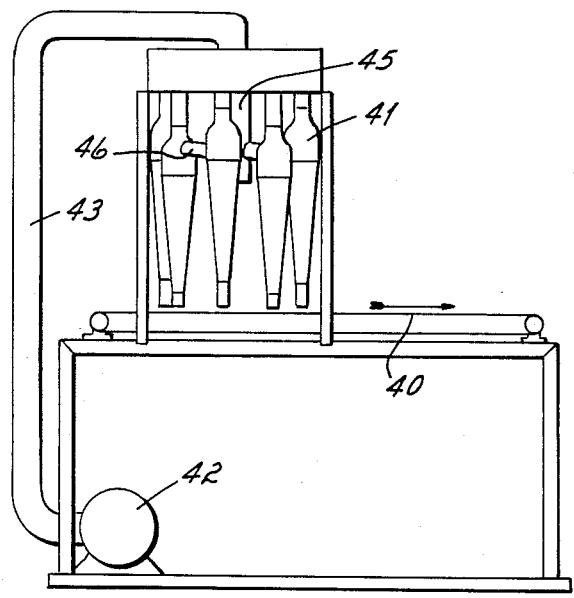
FIG. 2 is a side elevational view of a further embodiment of the invention.
Figure 3:
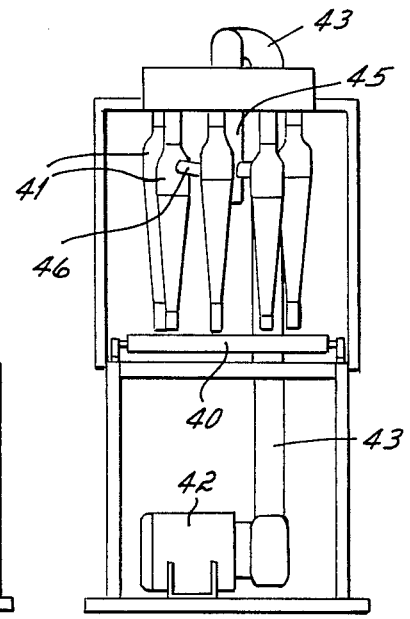
FIG. 3 is an end elevational view of the embodiment of FIG. 2.

The modified form of the invention is shown in FIGS. 2 and 3. There, a filter belt 40 has an upper flight that is about eight feet long and three feet wide. Overlying the upstream end of the filter belt is a cluster of hydrocyclones 41, eight hydrocyclones being disposed equally spaced in a circle overlying the filter belt. Of course, other manifolding arrangements of the hydrocyclones could be used. A pump 42 is connected to a pipe 43 for bringing slurry to the hydrocyclones. The slurry is brought to a manifold pipe 45 from which it is distributed to distributor pipes 46 connected to the tangential or volutes inlets of the respective hydrocyclones 41.

In this embodiment, the upper flight of the filter belt moves in the direction of the arrow at a rate of about one-half foot per minute. Each hydrocyclone delivers about one to two gallons of effluent per minute at the underflow of each hydrocyclone. In this embodiment, approximately 24,000 gallons of effluent are processed every hour with the resultant 1,000 pounds of filter cake having a consistency of between 70 and 80% solids collected every hour.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

We claim:

1. Dewatering apparatus comprising:

an elongated, endless filter belt passing around two spaced horizontal pulleys, said belt having an upper run, means for driving one of said pulleys to advance said upper run, a hydrocyclone having a tangential or volute inlet for introducing a slurry, an upper end for the discharge of water and a lower end for the discharge of a mixture of solids and water, and a shroud surrounding the lower end of said hydrocyclone, said shroud converting any horizontal components of the discharge from the lower end to vertical components to forcibly drive water through said filter belt, said hydrocyclone being disposed over the upstream end of said filter belt with only said shroud surrounding the lower end directing discharge onto said belt.

2. Dewatering apparatus as in claim 1 in which said filter belt is rated 20 microns to 150 microns.

3. Dewatering apparatus as in claim 1 in which a plurality of said hydrocylones overlie said filter belt.

* * * * *